(12) United States Patent
Kim (10) Patent No.: US 10,373,251 B2
(45) Date of Patent: Aug. 6, 2019

(54) FINANCIAL TRADING SYSTEM BASED ON REAL-TIME PREDICTION USING VIRTUAL CASH

(71) Applicant: Sung Hun Kim, Seoul (KR)

(72) Inventor: Sung Hun Kim, Seoul (KR)

( * ) Notice: Subject to any disclaimer, the term of this patent is extended or adjusted under 35 U.S.C. 154(b) by 888 days.

(21) Appl. No.: 14/887,349

(22) Filed: Oct. 20, 2015

(65) Prior Publication Data

US 2017/0103459 A1 Apr. 13, 2017

(30) Foreign Application Priority Data

Oct. 8, 2015 (KR) .......................... 10-2015-0141827

(51) Int. Cl.
*G06Q 40/04* (2012.01)
*G06Q 20/06* (2012.01)
*G06Q 20/38* (2012.01)
*G06Q 20/36* (2012.01)

(52) U.S. Cl.
CPC ........... *G06Q 40/04* (2013.01); *G06Q 20/065* (2013.01); *G06Q 20/36* (2013.01); *G06Q 20/3829* (2013.01)

(58) Field of Classification Search
None
See application file for complete search history.

(56) References Cited

U.S. PATENT DOCUMENTS

| | | | | |
|---|---|---|---|---|
| 6,188,993 B1* | 2/2001 | Eng | ........................ | G06Q 20/02 705/35 |
| 6,850,252 B1* | 2/2005 | Hoffberg | ............ | G06K 9/00369 348/E7.061 |
| 7,567,909 B1* | 7/2009 | Billingsley | ............ | G06Q 20/02 705/317 |
| 7,720,742 B1* | 5/2010 | Mauro | ................... | G06Q 40/00 705/37 |
| 2006/0161501 A1* | 7/2006 | Waserstein | ........... | G06Q 20/042 705/65 |

FOREIGN PATENT DOCUMENTS

| | | |
|---|---|---|
| JP | 2007-310562 A | 11/2007 |
| KR | 10-2014-0117821 A | 10/2014 |

* cited by examiner

*Primary Examiner* — Scott S Trotter
(74) *Attorney, Agent, or Firm* — Revolution IP, PLLC (57) ABSTRACT

A new type of financial trading model including a user terminal having an account application for storing a virtual cash blocks constructing the virtual cash, a service center installing the account application into the user terminal when the user requests product trade and conducting product trade by increasing or decreasing the virtual cash blocks stored into the account application based on an index change following time of a trading item after setting any one of a number of financial products that the index is being changed as time passed to the trading item according to a selection of the user, and a relay server receiving an index change data in real-time from a certified institution, which is used as a standard of product trade.

7 Claims, 5 Drawing Sheets

FINANCIAL TRADING SYSTEM BASED ON REAL-TIME PREDICTION USING VIRTUAL CASH

CROSS REFERENCE TO PRIOR APPLICATIONS

This application claims under 35 U.S.C. § 119(a) the benefit of Korean Patent Application No. 10-2015-0141827 filed on Oct. 8, 2015, the entire contents of which are incorporated herein by reference.

TECHNICAL FIELD

The present disclosure relates to a new type of financial trading model, more particularly, a financial trading system based on real-time prediction using a virtual cash capable of being created by using an encryption key, guaranteeing an anonymity of a trade, and being payed and traded through various types of tools, thereby easily and quickly being traded without the restriction on time-space.

BACKGROUND

Recently, the stagnation of financial market is lasting. In other words, there is a risk to a financial product, such as a foreign exchange dealings, a stock, a bond, and a futures. Accordingly, it is limited to make profits due to national environment, social mood, and international situation, etc.

Accordingly, a need is being emerged to a new type of the financial product. Its basic elements are that it is able to be easily and quickly traded, and to be traded without the restriction on time-space. In addition, there is a need for a financial product model capable of easily being trade and reliably predicting a risk and a profit compared to the trade of other derivative products.

Meanwhile, in the conventional art, a use of the profit created from the financial product is limited to an environment or an alliance environment that provides the financial product. Accordingly, there is a limitation to universally use the profit for the payment anywhere and at any time.

Further, it is exposed to the danger that a customer information such as a bank statement of the customer, or a deposit information, etc. may be leaked or changed due to a security vulnerability when the financial product is traded.

SUMMARY

The present disclosure is directed to providing a financial trading system based on real-time prediction using a virtual cash that a security is enhanced as well as convenience of the trade is supported.

The present disclosure is directed to providing the financial trading system based on real-time prediction using the virtual cash capable of being created by using an encryption key, guaranteeing an anonymity of a trade, and being payed and traded through various types of tools.

The present disclosure is directed to providing the financial trading system based on real-time prediction using the virtual cash capable of universally using a profit created from the financial product for payment without the restriction on physical environment anywhere and at any time.

According to an exemplary embodiment of the present disclosure, the financial trading system based on real-time prediction using the virtual cash is a system to provide a financial trading service based on real-time prediction using the virtual cash to a user who is connected through a communication network. The system includes a user terminal having an account application for storing a virtual cash blocks constructing the virtual cash, a service center installing the account application into the user terminal when the user requests a product trade and conducting the product trade by decreasing or increasing the virtual cash blocks stored into the account application based on an index change following time of a trading item after setting any one of a number of financial products that an index is being changed as time passed to the trading item according to a selection of the user, and a relay server receiving an index change data in real-time from a certified institution, which is used as a standard of the product trade.

The service center includes a first server that generates a pair of encryption keys when the account application is installed into the user terminal, and decreases or increases the virtual cash blocks stored in the account application according to a result of the product trade, and a second server that sets at least one of the virtual cash blocks stored in the account application to an investment of the product trade and then begins the product trade in a state that a predictive value of an index change direction against the trading item, and determines whether the prediction is success or not to the index change direction of the trading item at a predetermined end time against the product trade.

Depending on success or failure being determined in the second server, the first server decreases or decreases by the investment in the virtual cash blocks stored in the account application.

According to an exemplary embodiment of the present disclosure, it is capable of using the virtual cash being created by using an encryption key, guaranteeing the anonymity of the trade, being payed and traded through various types of tools, and universally using the profits (virtual cash) created from the financial product without the restriction on time-space anywhere and at any time, thereby providing the financial trade that security is enhanced as well as convenience of the trade is supported.

Further, a method of the trade is easier than other derivative product trading method and there is no restriction on time-space in trade and it may give a guarantee fast profits by clearly predicting a risk and the profit.

DETAILED DESCRIPTION

Hereinafter, the present disclosure and methods may be understood more readily by reference to the following detailed description of embodiments and the accompanying drawings. However, the present disclosure may be embodied in many different forms, and should not be construed as being limited to the embodiments set forth herein.

Hereinafter, a financial trading system based on real-time prediction using a virtual cash according to the exemplary embodiment of the present disclosure will be described in detail with reference to the accompanying drawings.

Herein, an operation of 'setting' means a process being defined according to a selection or an input of a user in the system.

In addition, herein, the service center may be a server providing the financial trading service based on real-time prediction using the virtual cash to a user who is connected through a communication network, and a number of servers in the service center may be understood as an engines of the servers that performs a specified function. Especially, the user who connects to the service center through the communication network may be understood as a user terminal enrolled in the service center for service.

Figure 1:
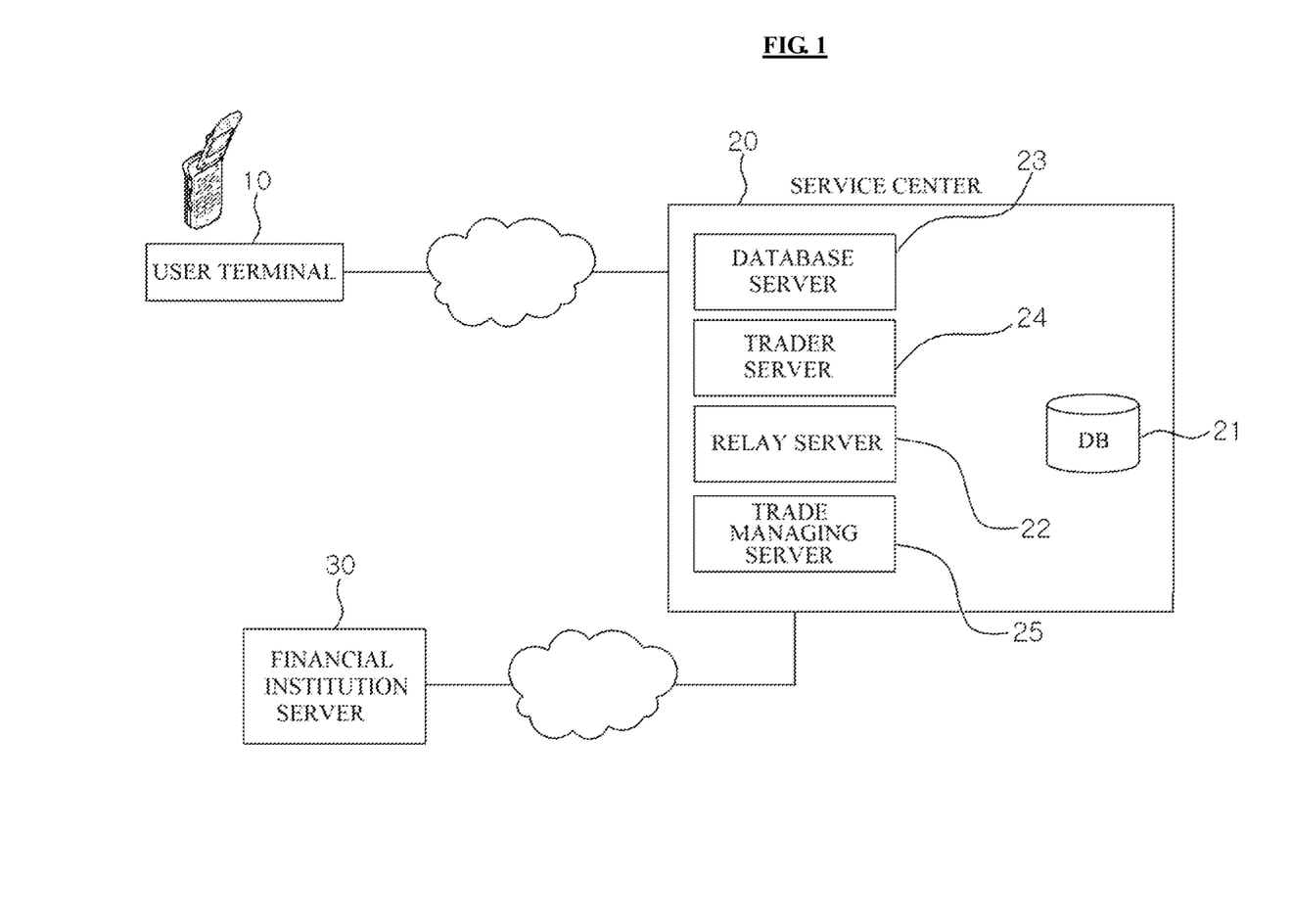
FIG. 1 is a block diagram illustrating whole constitution of a financial trading system based on real-time prediction using a virtual cash according to an exemplary embodiment of the present disclosure.

FIG. 1 is a block diagram illustrating whole constitution of the financial trading system based on real-time prediction using the virtual cash according to an exemplary embodiment of the present disclosure.

In FIG. 1, a financial institution server 30 exchanging a data with a service center 20 in real-time may be variously changed depending on a financial trade. Further, it is desirable that the financial institution server 30 is a server of an institution certified for the financial trade.

As illustrated in FIG. 1, a system of the present disclosure is composed of a user terminal 10, the service center 20, and the financial institution server 30.

Figure 2:
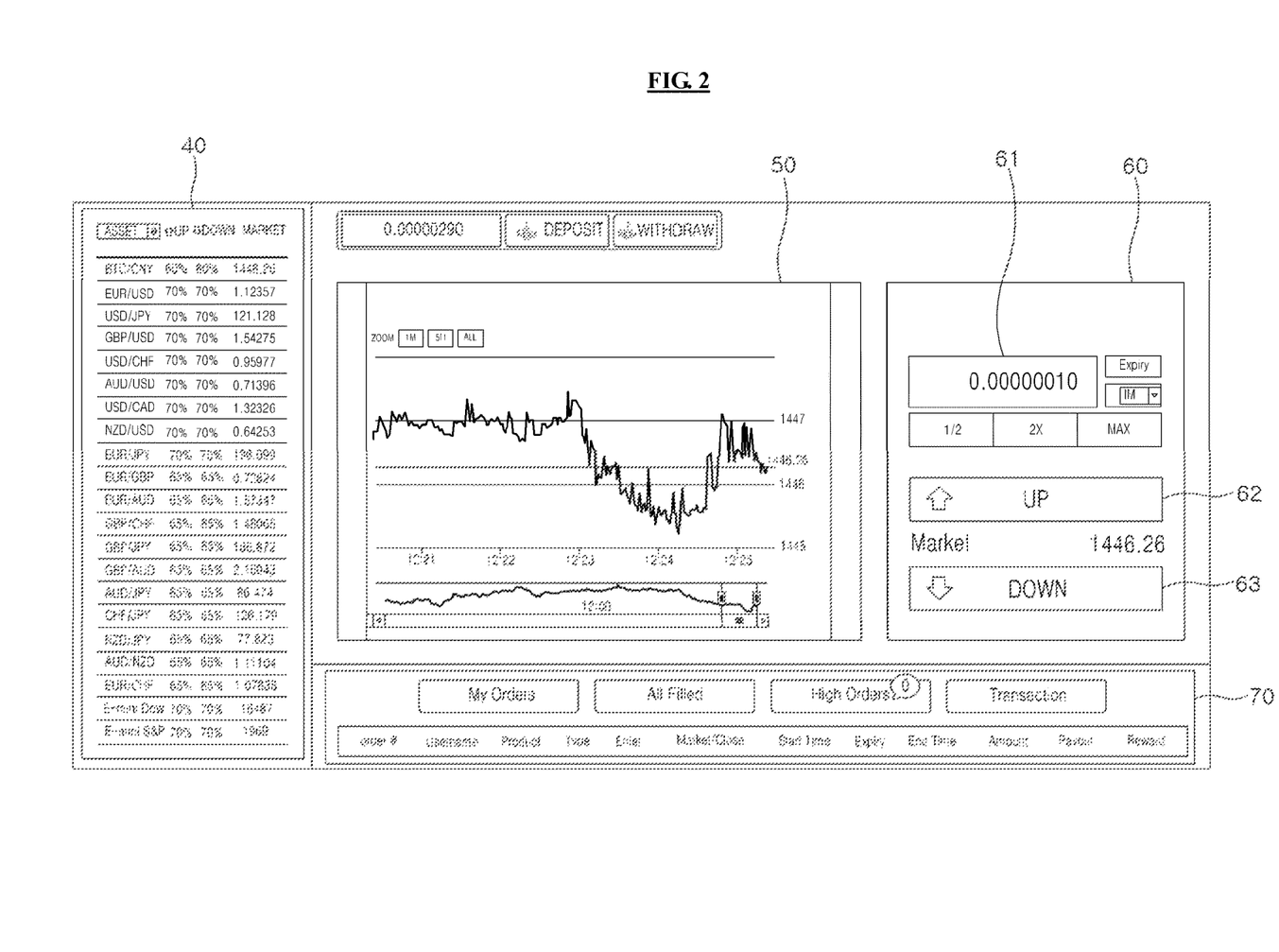
FIG. 2 to FIG. 4 are a diagram a user interface constitution in the financial trading system based on real-time prediction using the virtual cash according to an exemplary embodiment of the present disclosure.
Figure 3:
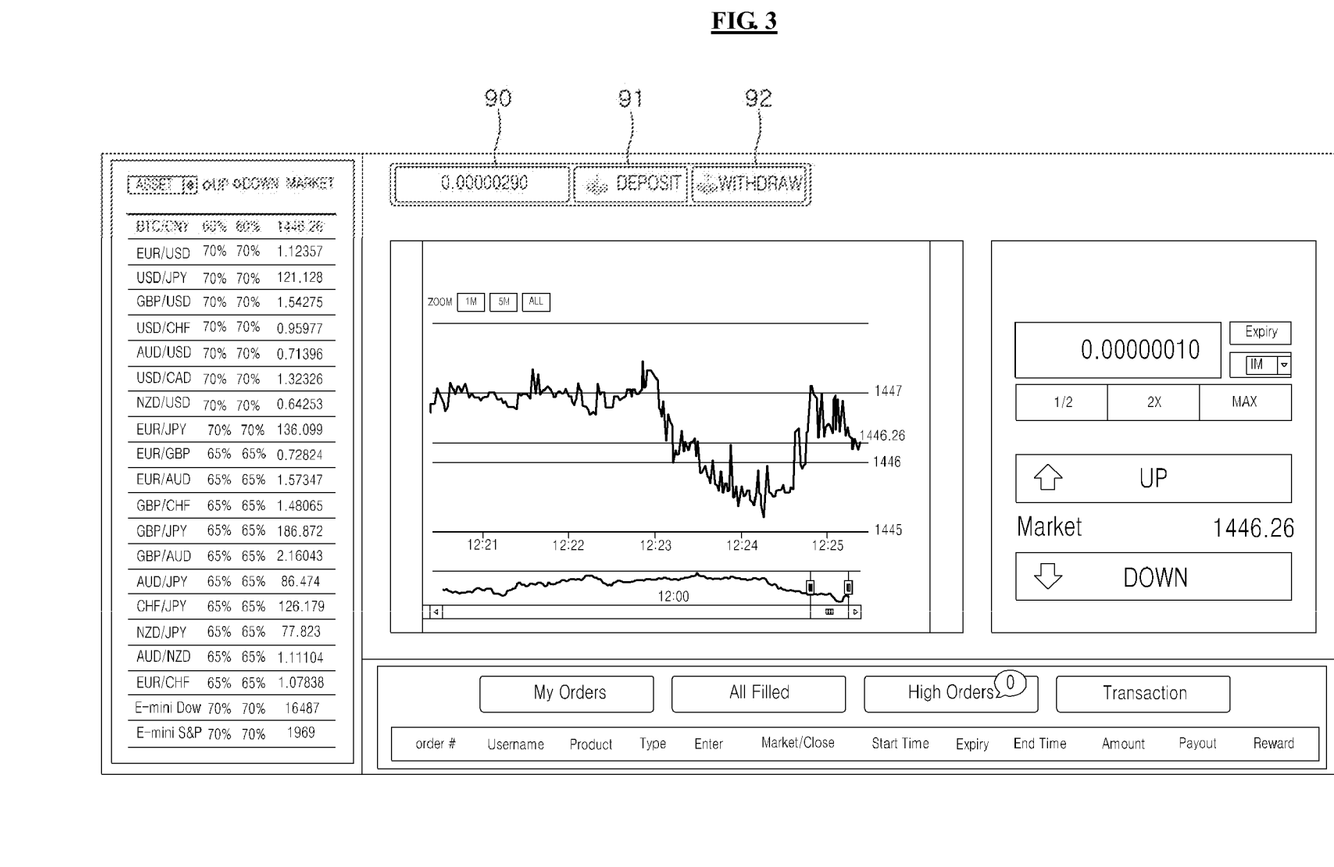
Figure 4:
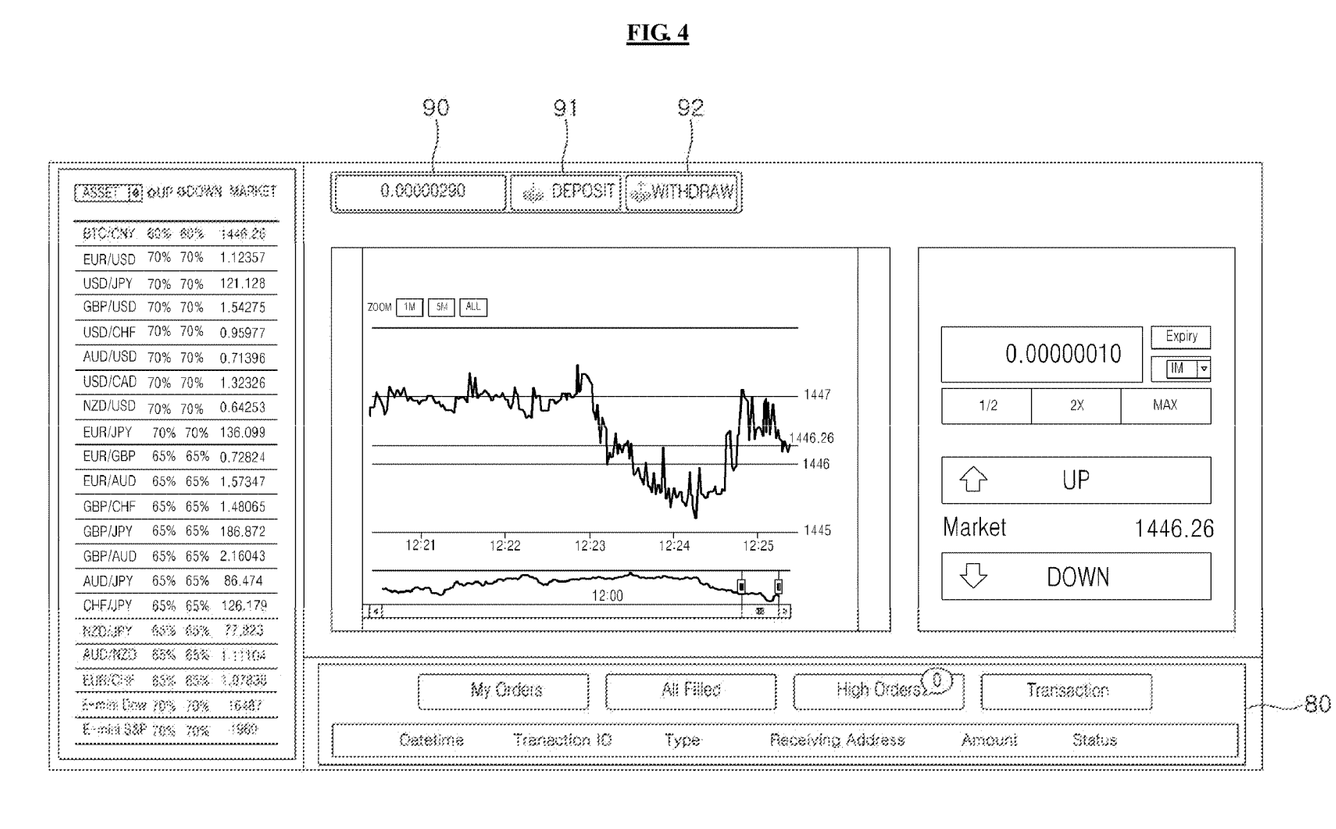

The user terminal 10 has a user application for predicting a trade that is provided from the service center 20, and, as shown in FIG. 2 to FIG. 4, the user application provides a user interface for a number of financial product posts, a trading item selection, a product trading process confirmation, a user account management, a product trade and payment details management, and a deposit and withdrawal management, etc.

The user terminal 10 has an account application for storing the virtual cash. Herein, the virtual cash is composed of a number of virtual cash blocks, and the sum of the number of virtual cash blocks applies to one virtual cash. In addition, a product value of the virtual cash blocks is defined by an encryption key value described later.

The service center 20 is composed of a database 21, a relay server 22, a database server 23, a trader server 24, and a trade managing server 25.

The service center 20 installs the account application of the user who requests the product trade into the user terminal 10, and updates the product value of the virtual cash blocks stored in the account application based on the product trading result.

More specifically, the service center 20 installs the account application into the user terminal 10 as the user requests the product trade.

As one of a number of financial products that an index is being changed as time passed is selected by the user, the service center 20 sets the selected financial product to the trading item. Then, the service center 20 conducts the product trade to decrease or increase the virtual cash blocks stored in the account application based on the index being changed as time passed of the trading item.

The service center 20 provides the user application for supporting the product trade through the user interface. The user application is downloaded and installed into the user terminal 10 when the user enrolls in the service center, and thereby providing the user interface for the product trade.

Since the user application is implemented in the user terminal 10, it includes a first region (hereinafter, trade object selecting region) 40 for posting a number of financial products and selecting the trading item among the number of financial products, a second region (hereinafter, index change providing region) 50 that posts an index change state of the trading item in real-time from the start time of the product trade to the end time, a third region (hereinafter, investment selection and index prediction region) 60 for inputting of the investment to the trading item and selecting a predictive value to the trading item, and a fourth region (hereinafter, user details providing region) 70 that posts a trade details and payment details of the product trade. In the above description, the investment selection and index prediction region 60 may include a button region for starting of the product trade, and post success or failure of the trading item at the end of time of the product trade.

The service center 20 provides a service for the financial trade through the user interface of the user terminal 10, and posts a stock, a foreign exchange dealings, a futures, a bond, a product replacement resource such as a gold or a silver, etc. as the financial product being traded based on real-time prediction. Especially, the service center 20 provides the product trade of the number of financial products that the index is being changed as time passed.

The relay server 22 receives the index changing data of each of the financial products in real-time with the financial institution server 30. The relay server 22 receives the index changing data of the trading item that is being used as a standard in the product trade of the service center 20 in real-time from the financial institution server 30, which is a server of the certified institution. The relay server 22 may be implemented as a component of the service center 20, or the relay server 22 may be composed independently from the service center 20, thereby being able to be connected to the service center 20 through the communication network.

The service center 20 sets any one of the number of financial products that the index is being changed as time passed to the trading item, and conducts the product trade to decrease or increase the virtual cash blocks stored in the account application based on the index being changed as time passed of the trading item, and records a details of dealing of the product trade.

Accordingly, the service center 20 is comprised of a first server (hereinafter, trade managing server) 25 that installs the account application into the user terminal 10 and then updates the virtual cash blocks stored in the account application, thereby decreasing or increasing them, a second server (hereinafter, trader server) 24 that sets at least one of the virtual cash blocks stored in the account application to the investment of the product trade and then conducts the relevant product trade, and a third server (hereinafter, database server) 23 that stores the trade details including a change details of the virtual cash blocks according to the result of the product trade in the database 21 and manages it.

The trade managing server 25 generates the account application and then installs it into the user terminal 10. Accordingly, the virtual cash blocks being purchased by the user are stored in the account application. Herein, the method storing the virtual cash blocks in the account application, when it generates the account application and installs it, also generates a pair of encryption keys and provides them to the user terminal 10. The user terminal 10 stores the pair of encryption keys interworking with the account application. More preferably, the trade managing server 25 installs the account application into the user terminal 10, with storing the pair of encryption keys in the user terminal 10. The pair of encryption keys generated by the trade managing server 25 are updated by the account application installed into the user terminal 10, and they are being used as a means for changing the product value into a virtual cash block unit.

The trade managing server 25 stores one of the pair of encryption keys in the user terminal 10 as a private key, and stores another as a public key.

In addition, the trade managing server 25 generates a user identifier by hashing the private key, and then stores the generated user identifier in the user terminal 10. Herein, the user identifier may be once generated when the account application is installed and then it may be reused every time when the product trade is conducted by the trader server 24. Otherwise, the trade managing server 25 may generate a new user identifier every time when the product trade is conducted by the trader server 24 and then store it in the user terminal 10.

Besides the above described the product trade, if a withdrawal or a payment is requested to the virtual cash blocks stored in the account application, the service center 20 may transmit the requested virtual cash blocks to an address preciously registered by the user or an address provided by the user. After the withdrawal or the payment, the virtual cash blocks stored in the account application of the user terminal 10 is decreased. Herein, the transmission of the virtual cash block may be understood as a concept of transfer.

The pair of encryption keys generated by the trade managing server 25 represent an amount of the virtual cash blocks stored in the account application, therefore, the product value of the virtual cash blocks may be changed, with being updated the encryption key in the account application.

The virtual cash blocks stored in the account application may include a change details being decreased or increased according to the result of the product trade by the trader server 24, and it may be understood as the pair of encryption keys define the change details.

The virtual cash block is stored in the account application as a hash function value, and the product value of the virtual cash block is changed, with being updated the hash function value. More specifically, the hash function value according to the result of the previous product trade is updated to a new hash function value according to the result of current product trade, thereby decreasing or increasing the virtual cash blocks.

The trader server 24 provides the user interface including the above described number of regions, and conducts the product trade to any one of the financial products capable of providing service through the user interface.

The trader server 24 sets at least one of the virtual cash blocks stored in the account application to the investment of the product trade. The setting of the investment follows the selection of the user. Subsequently, according to the input and the selection of the user, the trader server 24 begins the product trade in a state that the predictive value of the index change direction to the trading item is set, and determines success or failure of the prediction to the index change direction of the trading item at the predetermined end time with regard to the product trade.

Based on success or failure of the prediction to the index change direction of the trading item determined in the trader server 24, the trade managing server 25 updates the virtual cash block stored in the account application. Through updating of the virtual cash block, the virtual cash block is decreased or increased by the value corresponding to the investment according to the product trade.

The trader server 24 sets the investment when the user signed digital signature by using the private key stored in the user terminal 10. In this case, the trader server 24 verifies the user who signed digital signature by using the public key. The trader server 24 qualifies the investment when the verification to the user is succeeded. In other words, the trader server 24 verifies to the user through digital signature, and the verification is succeeded, it sets a valid investment of the product trade by qualifying to the investment set for product trade.

The trader server 24 is a component conducting the trade of the financial product in real-time, and ensures a profitability and provides the product trade to a number of financial products that the index is being changed as time passed. When certain fixed time to a specific trading item selected through the trade object selecting region 40 is passed, the trader server 24 provides a prediction result that the index of the selected trading item is increased or decreased.

The trader server 24 determines success or failure of the prediction to the index change direction of the relevant selected trading item according to the following listed standards.

First, if the predictive value given according to the selection of the user through the investment selection and index prediction region 60 is a value that predicts an index ascend of the selected trading item, and the index of the trading item is changed to the ascended direction at the end of time based on the index to the trading item at the start of time that the product trade begins, it will be determined that the prediction to the index change direction of the relevant trading item is success.

Second, if the predictive value given according to the selection of the user through the investment selection and index prediction region 60 is a value that predicts an index descend of the selected trading item, and the index of the trading item is changed to the descended direction at the end of time based on the index to the trading item at the start of time that the product trade begins, it will be determined that the prediction to the index change direction of the relevant trading item is success.

Third, if the predictive value given according to the selection of the user through the investment selection and index prediction region 60 is a value that predicts an index ascend of the selected trading item, and the index of the trading item is changed to the descended direction at the end of time based on the index to the trading item at the start of time that the product trade begins, it will be determined that the prediction to the index change direction of the relevant trading item is failure.

Fourth, if the predictive value given according to the selection of the user through the investment selection and index prediction region 60 is a value that predicts an index descend of the selected trading item, and the index of the trading item is changed to the ascended direction at the end of time based on the index to the trading item at the start of time that product trade begins, it will be determined that the prediction to the index change direction of the relevant trading item is failure.

If the trader server 24 determines that the prediction to the index change direction of the trading item is success, the trade managing server 25 will update the encryption key (private key) value stored in the user terminal 10 and increase the virtual cash block stored in the account application by the inputted investment. Whereas, if the trader server 24 determines that the prediction to the index change direction of the trading item is failure, the trade managing server 25 will update the encryption key (private key) value stored in the user terminal 10 and decrease the virtual cash block stored in the account application by the inputted investment.

In the trader server 24, if the index to the trading item of the time that the product trade begins and the index of the trading item at the end of time is equal, that is, the prediction to the index change direction of the trading item is draw (neither success nor failure), the trade managing server 25 maintains a value of the virtual cash block stored in the account application. In other words, the encryption key value defining the value of the virtual cash block is not updated.

Meanwhile, the trader server 24 posts an index changing state of the trading item that is currently trading through the index change providing region 50 in real-time. In other words, the trader server 24 provides the index changing state of the relevant trading item from the start time of the product trade to the end time by using the index change data being received through the relay server 25 in real-time.

Like this, the system according the present disclosure stores the virtual cash block in the account application that is installed following a request for the product trade, and provides the profit through a real-time prediction of the index based on the index change of currently existed financial products, with permitting a part of product values of the virtual cash block to the investment.

The database server 23 updates a change details of the virtual cash block per user that is updated through the trade managing server 25 and a change details of the virtual cash blocks according to the payment using the virtual cash blocks of the account application, and stores and manages a product trading details and a payment details per user. In addition, the database server 23 stores a real-time index data received through the relay server 22 and updates it in real-time, and stores an account of the user accessing through the user terminal 10.

FIG. 2 to FIG. 4 are a diagram the user interface constitution in the financial trading system based on real-time prediction using the virtual cash according to an exemplary embodiment of the present disclosure, and the service center 20 downloads and installs the user application providing the user interface shown in FIG. 2 to FIG. 4 into a dedicated terminal of the user who is enrolled in the service, that is, the user terminal 10.

After running the user application, if the service center 20 is authenticated by using an information of the relevant user, it supports the product trade and an information management through the user interface in FIG. 2 to FIG. 4.

The tradable financial products through the system according to the present disclosure may include goods replacement product such as wheat, sugar, corn, coffee, crude oil, white gold, silver, or gold, and include a financial index per each country, a stock index per each company, or an exchange rate (foreign exchange) of currency.

The user interface has the trade object selecting region 40 to enable the user to select any one of the listed number of products as the trading item and proceed the trade.

The user interface has the index change providing region 50 that provides a real-time index change situation of the selected trading item through the trade object selecting region 40. The real-time index change situation being provided through the index change providing region 50 is based on the index change data being provided from the financial institution server 30. Herein, the index change providing region 50 may post a change of the selected trading item at the present time, that is, up and down of the selected trading item, particularly, may post success, failure, or draw of the prediction at the end of time of the trade to the relevant trading item.

The user interface selects a predictive value of up and down at the specified time based on the real-time index change situation of the selected trading item, also has the investment selection and index prediction region 60 for inputting the investment of the product trade. Herein, according to the selection of the predictive value of up and down, the product trade to the trading item selected through the trade object selecting region 40 begins.

The user details providing region 70 in the user interface posts a profit ranking to the user and a number of other users receiving a service of the product trade through the service center 20, a profit ranking to all users receiving a service of the product trade through the service center 20, and the trading and payment details.

The item being posted through the user details providing region 70 may include a personal data of the user, a profit ranking, a trading information including trade product, a selected predictive value (up or down), and time, etc., and a change state of the virtual cash block according to the product trading result. Further, it may include a result of the payment using the virtual cash block of the account application, that is, an information including a date and time of the payment, an identifier, an address of the identifier, and a result of the payment.

The user details providing region 70 of the user interface may manage an account management per user, an accumulation of the profit and the withdrawal details, and the product trade details and payment details, and may post the related information.

According to the system of the present disclosure, as shown in FIG. 2, any one of the number of products is selected in the trade object selecting region 40, thereby setting the selected item to the product trading object. Herein, a number of financial products being posted is changed as time passed, and it is desirable that the index change to each of the financial products is processed by a certified institution in real-time.

According to the system of the present disclosure, as the investment to the trading item is inputted through an entry column 61 of the investment selection and index prediction region 60, the inputted investment is set. Herein, to obtain a valid qualification to the investment, it is verified by digital signature of the user.

Additionally, according to the system of the present disclosure, as shown in FIG. 2, as the index direction is selected through a control buttons 62, 63 for selecting up or down in the investment selection and index prediction region 60 at the start time of the product trade, the selected index direction is set to the predictive value at the time of the product trade, and it beings the product trade to the relevant trading item. Further, the investment selection and index prediction region 60 posts a current index of the relevant index item at the start time, and the index change providing region 50 posts a change state as time passed from the start time to the end time.

In the system of the present disclosure, as the product trade to the trading item begins, the index change providing region 50 posts an index of the trading item at the start time and the end time, an index at present. Further, it may post success or failure to the index direction prediction of the product trade at the end of time as a success, failure, or draw.

When success or not of the product trade is posted through the index change providing region 50, the relevant product trade is ended.

The user details providing region 70 posts various details to the virtual cash block stored in current account application.

In addition, the withdrawal or payment request of the user to the virtual cash block and the related things are processed through the user details providing region 70. In other words, as the withdrawal or payment amount is being inputted in the user details providing region 70, the system updates the virtual cash block corresponding to the withdrawal or payment amount and deducts the value. Further, it is possible to transfer the relevant withdrawal amount to a register account of the user.

Additionally, it is possible to process a deposit request of the user and the related things in the user details providing region 70.

According to the system of the present disclosure, as the product trading details per user that is processed in the user details providing region 70 during the specific period is requested, the relevant product trading details is posted through the user details providing region 70. The product trading details may include an investment per each of the product trades, a trading item, an index direction predicted by the user, a product trading date and period, an index of the product trade at the start time, an index of the product trade at the end time, and a withdrawal or payment details of the virtual cash block.

Figure 5:
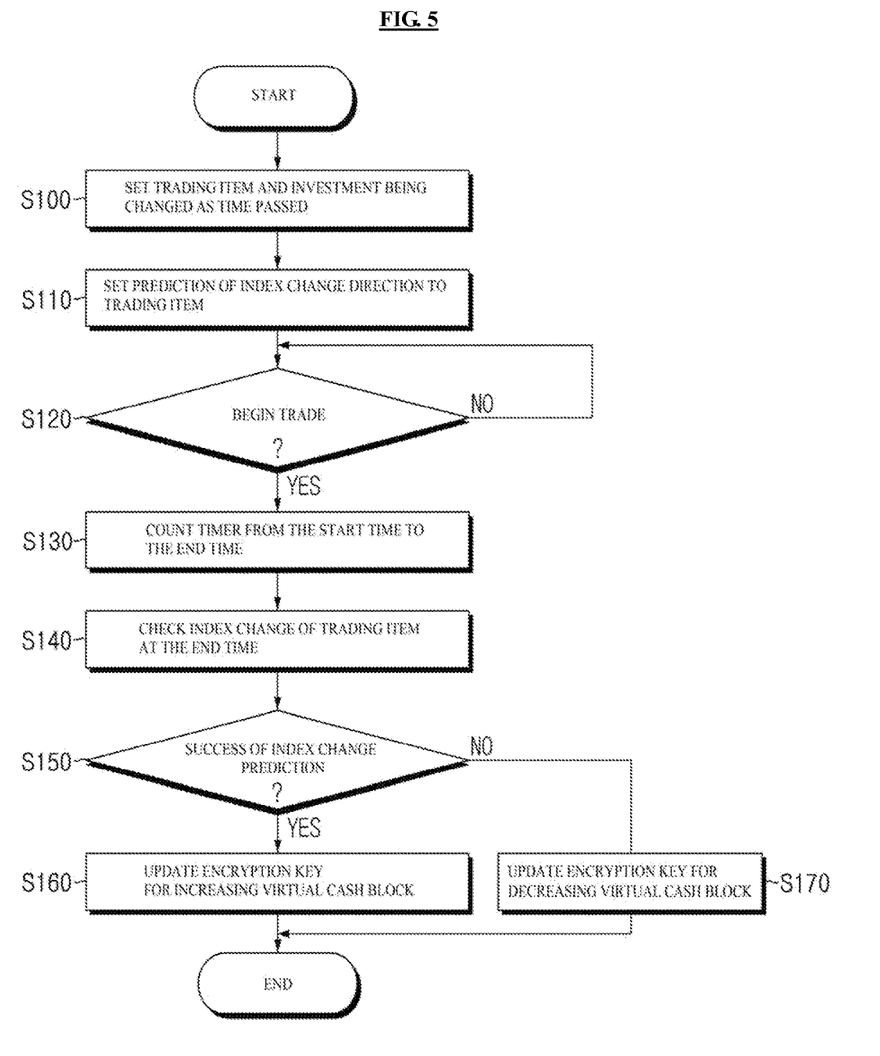
FIG. 5 is a flowchart explaining a financial trading procedure based on real-time prediction using the virtual cash according to an exemplary embodiment of the present disclosure.

FIG. 5 is a flowchart explaining the financial trading procedure based on real-time prediction using the virtual cash according to an exemplary embodiment of the present disclosure, and illustrates the financial trade and payment procedure conducted by the trader server 24 and the trade managing server 25.

In FIG. 5, the trade server 24 sets any one of a number of financial products that the index is being changed as time passed to the trading item, and sets the investment of the trading item by using the virtual cash block of the account application at step 100. Herein, the setting of the trading item and the investment is conducted according to the selection and input of the user, and digital signature of the user is signed to verify a validity of the investment.

Subsequently, the trader server 24 sets the predictive value of the index change direction to the set trading item at step 110. In this case, in accordance with the result of the trading item that is set by the user, that is, in accordance with the selection of the user to the index up or down, the predictive value is set.

Next, the trader server 24 begins the product trade in a state that the predictive value of the index change direction to the trading item according to the selection and input of the user is set at step 120, and then it counts a timer from the start time to the end time of the product trade at step 130. Herein, the trading period from the start time to the end time may be variously set to a second unit, a minute unit, and an hour unit, etc. For example, if the trading period is set to 60 seconds, the timer is stopped after 60 seconds, therefore, the product trade is closed.

In succession, the trader server 24 checks the index change to the trading item that is set at the end time of the trading period at step 140. Herein, the check of the index change checks that the index is increased or decreased at the end time based on the index of the trading item at the start time.

Subsequently, the trader server 24 checks success or failure of the prediction to the index change that is set based on the result of the index change check at step 150. The determination that the index change prediction is successful or not is described in the above, therefore, the detailed description will be omitted.

Next, since the success or not is determined in the trader server 24, the trade managing server 25 updates the encryption key for increasing the virtual cash block or updates the encryption key for decreasing the virtual cash block according to the failure of the prediction at steps 160, 170, respectively. In other words, in case of success of the prediction, the virtual cash block is increased by the investment, and in case of failure of the prediction, the virtual cash block is decreased by the investment.

While the description of the present disclosure has been made to the exemplary embodiments, various changes and modifications may be made without departing from the scope of the present invention. The embodiment of the present invention is not limited thereto.

Therefore, the scope of the present invention should be defined by the appended claims rather than the foregoing embodiments.

What is claimed is:
1. A financial trading system based on real-time prediction using a cryptographic virtual cash, the system comprising:
 a memory configured to store program instructions; and
 at least one processor, coupled to said memory, and configured to execute the program instructions to implement a method comprising:
  by a user terminal, storing the number of virtual cash blocks, the user terminal having an account application suitable for the storing, wherein a virtual cash block is a unit constructing the cryptographic virtual cash;
  by a service center, installing the account application onto the user terminal for a product trade, setting one of financial products whose index changes as time passed as a trading item, and conducting the product trade which decreases or increases the virtual cash blocks stored in the account application based on an index change of the set trading item over time during the user-selected duration; and
  by a relay server, receiving index change data of the trading item from a certified institution in real-time, wherein the index change data is used as a standard of the product trade,
  wherein the service center performs the steps:
   generating a pair of encryption keys upon installation of the account application, wherein the pair of encryption keys represents an amount of the virtual cash blocks stored in the account application;
   setting at least one of the virtual cash blocks stored in the account application to an investment of the product trade;
   beginning the product trade in a state that a predictive value of an index change direction to the trading item is set;
   determining success or not of a prediction to the index change direction of the trading item to the product trade at the predetermined end time; and
   decreasing or increasing the invested virtual cash blocks from the number of virtual cash blocks stored within the account application according to a result of the prediction, wherein the service center decreases or increases the invested virtual cash blocks by updating the pair of encryption keys,
  wherein the service center further performs:

storing one of the pair of encryption keys as a private key while installing the account application onto the user terminal, and storing another as a public key;

generating a user identifier through hashing of the private key; and storing the generated user identifier in the user terminal, wherein the virtual cash blocks are stored in the account application as a hash function value, decreased or increased by updating the pair of encryption keys according to updating the hash function value by a result of the previous product trade into a new hash function value by a result of the current product trade, and include a change details being decreased or increased according to the result of the product trade.

2. The financial trading system of claim 1, wherein the service center further performs:

previously verifying to the user by using the public key when the user sets the investment of the product trade through digital signature using the private key stored in the user terminal, and qualifying to the investment when a verification to the user is successful.

3. The financial trading system of claim 1, wherein the service center further performs:

if the predictive value given according to the selection of the user is a value that predicts an index ascend, and the index of the trading item is changed to the ascended direction at the end of time based on the index to the trading item at the start of time that the product trade begins, determining that the prediction to the index change direction of the trading item is success;

if the predictive value given according to the selection of the is a value that predicts an index descend of the selected trading item, and the index of the trading item is changed to the descended direction at the end of time based on the index to the trading item at the start of time that the product trade begins, determining that the prediction to the index change direction of the trading item is success;

if the predictive value given according to the selection of the user is a value that predicts an index ascend of the selected trading item, and the index of the trading item is changed to the descended direction at the end of time based on the index to the trading item at the start of time that the product trade begins, determining that the prediction to the index change direction of the trading item is failure; and if the predictive value given according to the selection of the user is a value that predicts an index descend of the selected trading item, and the index of the trading item is changed to the ascended direction at the end of time based on the index to the trading item at the start of time that the product trade begins, determining that the prediction to the index change direction of the trading item is failure.

4. The financial trading system of claim 3, wherein the service center further performs:

increasing the virtual cash blocks stored in the account application by the investment when the prediction to the index change direction of the trading item is successful; and decreasing the virtual cash blocks stored in the account application by the investment when the prediction to the index change direction of the trading item is failure.

5. The financial trading system of claim 1, wherein the service center further performs providing the index change state of the trading item in real-time from the start time of the product trade to the end time by using the index change data being received in real-time through the relay server.

6. The financial trading system of claim 1, wherein the service center further performs;

providing the user application to provide the product trade through the user interface; and comprising a first region for selecting the trading item among the number of financial products when the user application is executed in the user terminal, a second region for posting the index change state of the trading item in real-time from the start time of the product trade to the end time, a third region for setting the investment and selecting the predictive value and starting the product trade, and a fourth region for posting the trading details.

7. The financial trading system of claim 6, wherein the third region posts success or not of the prediction of the trading item at the end time.

* * * * *